United States Patent
Schwarte et al.

(10) Patent No.: US 10,570,861 B2
(45) Date of Patent: Feb. 25, 2020

(54) MULTI-FUEL INJECTOR FOR AN INTERNAL COMBUSTION ENGINE, METHOD FOR OPERATING A MULTI-FUEL INJECTOR AND INTERNAL COMBUSTION ENGINE

(71) Applicant: MTU FRIEDRICHSHAFEN GMBH, Friedrichshafen (DE)

(72) Inventors: Joachim Schwarte, Langenargen (DE); Samuel Vogel, Bad Waldsee (DE); Robby Gerbeth, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 22 days.

(21) Appl. No.: 15/486,356

(22) Filed: Apr. 13, 2017

(65) Prior Publication Data

US 2017/0218898 A1    Aug. 3, 2017

Related U.S. Application Data

(63) Continuation-in-part of application No. PCT/EP2016/000017, filed on Jan. 22, 2016.

(30) Foreign Application Priority Data

Feb. 27, 2015 (DE) .................. 10 2015 203 614

(51) Int. Cl.
*F02M 43/04* (2006.01)
*F02D 19/06* (2006.01)
(Continued)

(52) U.S. Cl.
CPC ......... *F02M 43/04* (2013.01); *F02D 19/0694* (2013.01); *F02D 19/10* (2013.01);
(Continued)

(58) Field of Classification Search
CPC ...... F02M 61/10; F02M 61/16; F02M 61/002; F02M 61/045; F02M 43/04;
(Continued)

(56) References Cited

U.S. PATENT DOCUMENTS

2009/0020631 A1    1/2009  Mashida et al.
2010/0199948 A1*   8/2010  Rogak ................ F02D 19/0647
                                                          123/304

FOREIGN PATENT DOCUMENTS

DE            10245161 A1    4/2004
DE       102008042227 A1    4/2010
(Continued)

*Primary Examiner* — George C Jin
(74) *Attorney, Agent, or Firm* — Klaus J. Bach

(57) ABSTRACT

In a multi-fuel injector for an internal combustion engine, including a housing with a nozzle needle movably disposed therein between a closed position in which the nozzle needle blocks a discharge of fuel from a collection chamber, to which a first fuel is supplied, above the nozzle needle, a control chamber is arranged to which a high pressure second fuel is supplied which acts on the nozzle needle to bias it into a closed position, and a control valve is provided in a pressure release line extending from the control chamber for a controlled release of the second fuel from the control chamber by opening the control valve so as to relief the closing pressure on the nozzle needle in order to permit lifting of the nozzle needle from the closed position for discharging the fuel from the collection chamber.

10 Claims, 1 Drawing Sheet

(51) Int. Cl.
  *F02M 63/02* (2006.01)
  *F02M 47/02* (2006.01)
  *F02M 55/00* (2006.01)
  *F02D 19/10* (2006.01)
  *F02M 61/10* (2006.01)
  *F02M 61/16* (2006.01)

(52) U.S. Cl.
  CPC ........ *F02M 47/027* (2013.01); *F02M 55/002* (2013.01); *F02M 61/10* (2013.01); *F02M 61/16* (2013.01); *F02M 63/028* (2013.01); *F02M 2547/005* (2013.01); *Y02T 10/36* (2013.01)

(58) Field of Classification Search
  CPC .............. F02M 37/221; F02M 37/0064; F02D 17/0214; F02D 19/0647; F02D 19/081; F02D 19/061; F02D 19/0652; F02D 19/0689; F02D 19/0694; F02D 35/153; F02D 36/005
  See application file for complete search history.

(56) References Cited

FOREIGN PATENT DOCUMENTS

| | | |
|---|---|---|
| DE | 102008042531 | 4/2010 |
| JP | S61129461 A | 6/1986 |

\* cited by examiner

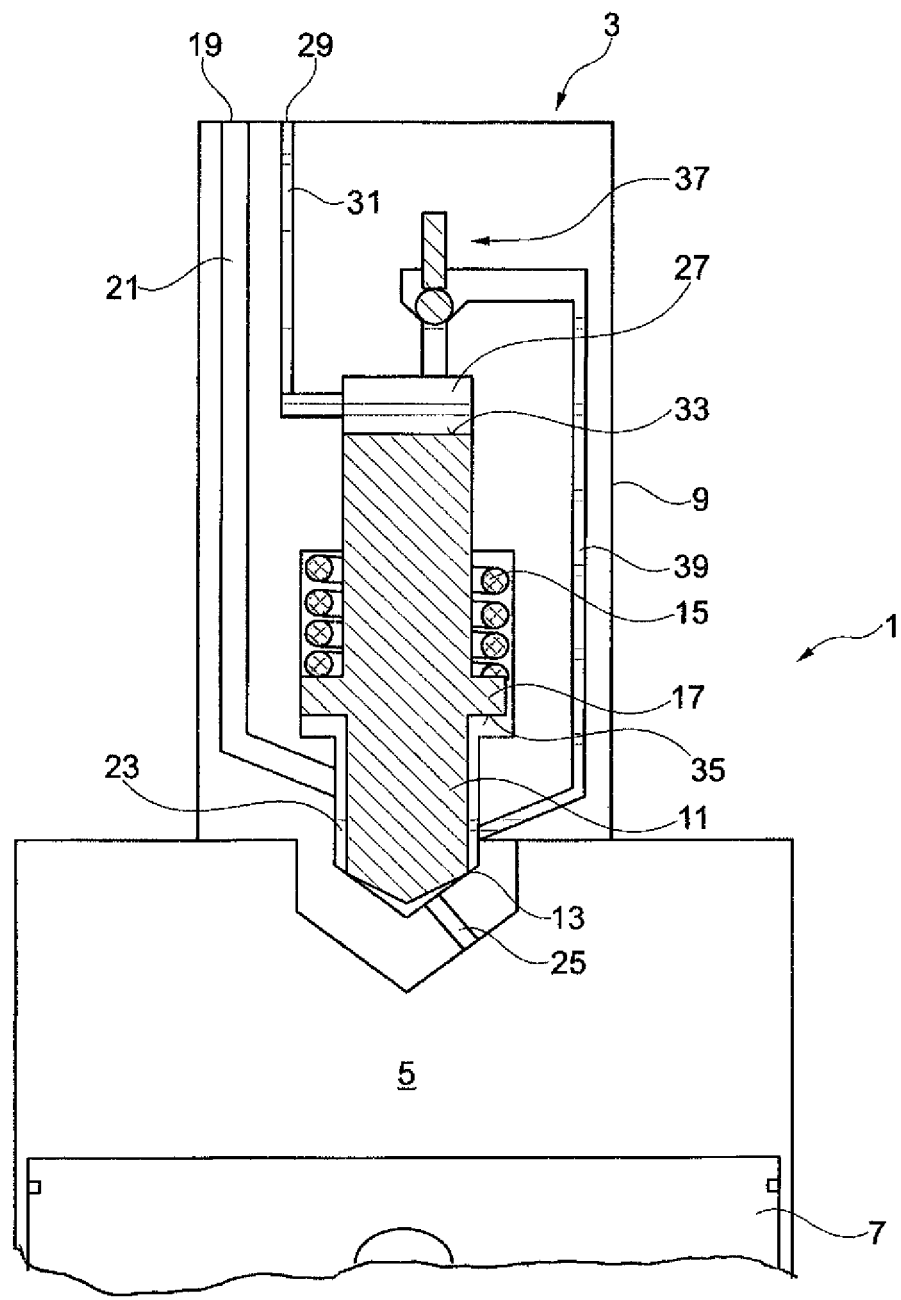

MULTI-FUEL INJECTOR FOR AN INTERNAL COMBUSTION ENGINE, METHOD FOR OPERATING A MULTI-FUEL INJECTOR AND INTERNAL COMBUSTION ENGINE

This is a Continuation-In-Part application of pending international patent application PCT/EP2016/00117 filed Jan. 22, 2016 and claiming the priority of German patent application 10 2015 2036.14 filed Feb. 27, 2015.

BACKGROUND OF THE INVENTION

The invention concerns a multi-fuel injector for an internal combustion engine, a method for operating a multi-fuel injector and an internal combustion engine provided with a multi-fuel injector.

Multi-fuel injectors are typically used for carrying out combustion processes in combustion chambers of an internal combustion engine, wherein a not easily ignitable fuel is ignited by so-called ignition jets of an ignitable pilot fuel such as Diesel fuel. Multi-fuel injectors designed for combustion methods include a base body in which several nozzle needles are movably arranged, for example radially next to one another or also co-axially with regard to one another, wherein one of the nozzle needles may be hollow. Each of the different fuels is assigned its own nozzle needle and each nozzle needle is assigned a collection chamber disposed in front of the nozzle needle. The different fuels are injected separately by actuation of the respective assigned nozzle needles. Such multi-fuel injectors are complex in their design with several actuator sealing area and guide structures. Typically, the nozzle needles are hydraulically controlled wherein a control leakage needs to be carried away. It is noted that, whether a single multi-fuel injector or a plurality of injectors are used for performing a combustion process with different fuels, the hydraulic control of the various injectors or the different nozzle needles is performed always with the same fuel, in particular with the pilot fuel. The pilot fuel therefore comes necessarily also in contact with a conduit system for the other fuel or fuels, which is a problem. In particular, a permanent leakage at a control valve effective as a pilot valve has been found problematic since it is possible for the leakage fuel to enter the conduit system and particularly the reservoir for another fuel. It may occur for example that Diesel fuel enters a combustible gas rail and even a high-pressure storage area for the combustible gas or that combustible gas together with a pilot Diesel leakage enters a Diesel fuel tank. This results in problems during refueling of the tank and the fuel transport as it results in an increased explosion danger. In order to overcome these disadvantages, it would be necessary to develop additional safety features for the separation of the fuels.

It is the object of the present invention to provide a multi-fuel injector, a method for operating a multi-fuel injector and an internal combustion engine where the disadvantages mentioned above do not occur.

SUMMARY OF THE INVENTION

In a multi-fuel injector for an internal combustion engine, including a housing with a nozzle needle movably disposed therein between a closed position in which the nozzle needle blocks a fuel discharge from a collection chamber through a discharge bore, to which a first fuel is supplied, above the nozzle needle a control chamber is arranged to which a high pressure second is supplied which acts on the needle valve to bias it into its closed position, and a control valve is provided in a pressure release line extending from the control chamber for a release of second fuel from the control chamber by opening the control valve to relief the control valve closing pressure in order to lift the nozzle needle for discharging the fuel from the collection chamber.

The multi-fuel injector according to the invention is adapted for use with an internal combustion engine. It comprises a base body in which a nozzle needle is movably arranged between a sealing position in which the nozzle needle is spring-biased onto a needle seat for closing the nozzle so as to block a fluid connection between a collection chamber and an injection passage of the multi-fuel injector and an open position where the nozzle needle is spaced from the needle seat so that the fluid connection between the fuel collection chamber and the injection passage is open or unblocked. The multi-fuel injector includes a first inlet opening for a first fuel which is in communication with the collection chamber. Above the nozzle needle, there is a control chamber which is in communication with a second inlet opening for a pressurized second fuel. The pressure in the control chamber can be released via a controllable valve in order to move the nozzle needle from the closed to the open position. The control chamber is in communication with the collection chamber via the controllable valve. In this multi-fuel injector, the nozzle needle serves as common valve element for the first and the second fuel. This is made possible as pressure is released from the control chamber to the collection chamber. In particular, the control leakage which occurs during the control of the controllable valve is conducted to the collection chamber which serves as a common collection chamber for the first fuel and the second fuel. Also, the at least one injection jet bore is used for the injection of the first and the second fuel. With this design of the multi-fuel injector advantages over the state of the art are obtained. In particular, the design of the multi-fuel injector is simplified; it requires only a single nozzle needle whereby it is robust and compact and relatively inexpensive. By releasing the control fuel from the control chamber into the common collection chamber, it is effectively prevented that the control fluid leakage enters the conduit system of the first fuel. The fuels are therefore not mixed or mixed at most to a small degree in the common collection chamber from which they are injected into the engine. They are kept away from the conduit system ahead of the multi-fuel injector and in particular from the reservoir and/or the tanks of the two fuels, that is, from the other, different type of fuel.

The pressure of the control chamber above the injection needle acts on the end of the needle axially opposite the needle seat, so that, above a certain pressure threshold of the pressure in the control chamber, the needle is sealingly pushed onto the needle seat and no fuel can flow out of the collection chamber to the at least one injection bore. When the control chamber is depressurized by actuating the control valve, so that the pressure in the control chamber drops below the pressure threshold, the nozzle needle lifts off the needle seat so that it is spaced therefrom and a fluid communication path between the collection space and the at least one injection bore is opened. As a result, by controlling the control valve, the multi-fuel injector can be activated by reducing the pressure in the control chamber to below the pressure threshold. Preferably, the nozzle needle is provided with a pressure sensor determining the pressure differential between a pressure in the collection chamber and the pressure in the control chamber, wherein the nozzle needle displacement depends on the pressure difference between these two pressures. Preferably, additionally, a spring element is provided which biases the nozzle needle toward the first functional position that is the closed position so that the differential pressure has to overcome the biasing force of the spring element to lift the valve needle off the valve seat.

Consequently, the controllable valve is adapted to release the pressure in the control chamber in such a way that the nozzle needle is moved from the first functional position to the second functional position when the pressure in the control chamber is released.

In a preferred exemplary embodiment of the multi-fuel injector, the control valve is leakage-free. It is particularly advantageous if the control valve is permanently leakage-free. Such leakage-free valves are designed to have no permanent leakage. In particular, there is above the valve element of the controllable valve, no pressure relief space so that no fuel can flow out via the valve. Different from a permanent leakage, there is the control leakage which necessarily occurs during an activation of the controllable valve and by which the pressure is released from the control chamber. As mentioned earlier, this control leakage is conducted in the proposed multi-fuel injector to the common collection chamber. It is particularly advantageous if the controllable valve is in the form of a magnetic valve. Preferably, the controllable valve is controllable by a control unit of the internal combustion engine which is provided with the multi-fuel injector, especially by a pulse-width modulated signal.

Preferably, an embodiment of the multi-fuel injector does not include a release conduit extending from control chamber to a fuel reservoir, in particular to a fuel reservoir for the second fuel. Rather, there is only a pressure release conduit of the control chamber which extends to the collection chamber. Any control leakage is therefore released to the common collection chamber.

In particular, if the controllable valve is of a permanently leakage-free design and no pressure release conduit extends from the control chamber to a fuel reservoir of the second fuel, the different fuel cannot be intermixed upstream of the multi-fuel injector in particular in the different fuel reservoirs and/or tanks.

The object is also solved in that a method for operating a multi-fuel injector is provided which includes the following steps: A first fuel is conducted to a collection chamber provided ahead of a needle seat of a nozzle needle of the multi-fuel injector. A second fuel is conducted from a control chamber provided for actuating the nozzle needle via a controllable valve to the collection chamber. The first and the second fuel are ejected from the collection chamber through at least one injection jet nozzle by actuation of the nozzle needle by operating the control valve so as to release the pressure in the control chamber to lift the nozzle needle from its seat. Particularly preferably, with this method, a multi-fuel injector is operated in accordance with one of the exemplary embodiments described earlier. In connection herewith in particular, the advantages are achieved which were already described in connection with the multi-fuel injector. With the method, the first fuel and the second fuel are supplied to a common collection chamber wherein, in particular, the second fuel is released from the control chamber to the common collection chamber. Furthermore, only one nozzle needle is provided which is used for the injection control of both fuels. It is possible that the second fuel is released from the control chamber to the common collection chamber and the first fuel is subsequently conducted to the common collection chamber. It is also possible to conduct the first fuel to the collection chamber and conduct the second fuel upon its release out of the control chamber into the common collection chamber. Further, a permanent fluid communication passage may be provided between the common collection chamber and a reservoir for the first fuel wherein at certain time an amount of the second fuel is released from the control chamber to the common collection chamber.

It is also possible that the two fuels, that is, the first and the second fuel are injected at the same time in a common injection event during a lift-off of the nozzle needle. Alternatively, with a first lift-off of the nozzle needle, a pilot amount of the second fuel may be injected, and, with a second lift off of the nozzle needle, essentially an amount of the first fuel mixed with a control leakage part of the second fuel which is unavoidable is injected. Also a plurality of different subsequent injection events may be provided. Herein, preferably, the amount of the second fuel to be injected together with the first fuel can be controlled. If in the common collection chamber, there is at the moment none or little of the second fuel disposed ahead of the first fuel the amount of second fuel to be injected together with the first fuel is determined dependent on a flow volume through the control valve and on the pressure ratio between the pressure in the collection chamber and the pressure in the control chamber.

In a preferred embodiment of the method, a pilot amount of the second fuel is released from the control chamber to the collection chamber by at least one short control signal input to the control valve for the release of fuel from the control chamber to the collection chamber whereby the nozzle needle is not displaced. Such a short control signal application is also called a blank-shot activation or activation without effect. Herein, a signal is supplied to the controllable valve while the nozzle needle does not react. The reason herefor may be that the fuel pressure in the control chamber needs to drop below a predetermined pressure threshold before the nozzle needle will actually lift off the needle seat, wherein the pressure actually does not fall below the pressure threshold. Alternatively, or additionally, preferably a delay period is provided by a mechanical inertia of the system of the nozzle needle and the spring element biasing the nozzle needle into the first functional position, so that also for that reason a sufficiently short control signal to the control valve has no effect on the position of the nozzle needle.

Still, also a short signal application that is, the control signal referred to herein, causes a certain amount of the second fuel to be controllably transferred from the control chamber via the control valve to the collection chamber. The amount of second fuel being transferred to the common collection chamber can be determined by the type and/or number of short signals applied to the control valve. It is in particular possible to collect in the collection chamber by the application of multiple short signals to the control valve for a first pilot injection a larger amount of the second fuel which is then injected in a first injection event as pilot injection wherein for the subsequent injection events of the same operating step only smaller amounts of the second fuel are transferred to the collection chamber. It is also possible that no short control signal is applied before the injection event so that essentially only the first fuel is injected except for the unavoidable control leakage of the second fuel to the collection chamber.

In a preferred embodiment of the method, Otto engine fuel is used as the first fuel. Particularly preferred as the first fuel is a combustible gas for example natural gas, biogas, deposition gas, low energy gas, or a special gas.

Alternatively, or additionally as second fuel, preferably a self-igniting liquid fuel, is used. Particularly preferred as self-igniting liquid fuel diesel fuel is used. It has been found that, with a liquid fuel, the control of the nozzle needle by pressure build up and pressure release in the control chamber can be achieved in a simple and reproducible manner.

It has further been found that the use of a gaseous first fuel is advantageous with regard to the common presence of both fuels in the common collection chamber. In this connection, it is in particular possible to provide a permanent fuel supply line between the common collection chambers and a fuel reservoir for the first fuel via which the common collection chamber is constantly supplied with combustion gas. When then an amount of the second fuel is supplied from the control chamber to the common collection chamber the liquid fuel accumulates immediately ahead of the nozzle needle and displaces there the gaseous first fuel. It is therefore ensured that always the accumulated amount of the second fuel is first injected as pilot jet through the injection bore before the gaseous fuel. At the same time, the following combustible gas can be utilized to atomize the second fuel during its injection. This corresponds to a so-called air blast. It is then possible to atomize the second fuel also at a relatively low pressure level—in comparison with a Diesel high pressure injection—and to reduce or avoid the formation of soot during the combustion of the second fuel.

With the injection of the fuels into a combustion chamber of an internal combustion engine, accordingly, no homogeneous mixture is ignited, rather the second fuel is first injected as a pilot jet which is self-ignited in the hot compressed combustion air of the combustion chamber and forms there a zonal flame front. The first fuel, in particular combustible gas, is injected following the second fuel and is ignited by the pilot flame of the second fuel burning already in the combustion chamber. Herein, the combustion is diffusion—controlled because the fuel and the combustion air are not mixed. This is advantageous in that knocking is avoided with this combustion.

Preferred is an embodiment of the method wherein a pressure of the first fuel in the collection chamber is smaller than the pressure of the second fuel in the control chamber when the control valve is closed. In this way, the pressure of the second fuel can be adapted to the pressure threshold required in the control chamber, so that the nozzle needle is biased toward the needle seat when the control valve is closed. At the same time, the first fuel can be kept at a comparatively low pressure which contributes to the safety and the economics of the operation of the internal combustion engine.

Preferably, the second fuel is maintained at a pressure level above the pressure level of the first fuel. In this way, the second fuel can be throttled by the control valve to the lower pressure level of the first fuel. For gaseous first fuels, the pressure is at least 100 bar and at most 300 bar. Liquid fuels are pressurized preferably to at least 1000 bar and at most 3000 bar. The amount of the pressure difference between the fuels is selected based on one hand on the surface effective for the hydraulic forces and, on the other hand, the pressure losses from the control chamber to the collection chamber preferably in such a way that the desired opening behavior of the nozzle needle as well as the desired delivery quantity of the second fuel is obtained.

In connection with the method of the invention, the second fuel is disposed in the collection chamber ahead of the first fuel. As already described, this is in particular possible if the first fuel is a gas and the second fuel is a liquid. In this way, the second fuel can be driven out of the collection chamber by the first fuel through the injection bore. And, in spite of a comparatively low pressure level during the injection of the second fuel, the second fuel can still be atomized to prevent the formation of soot as the gas jet of the first fuel drives the second fuel and effectively atomizes it. This provides for the "Air blast" mentioned earlier.

The invention also resides in an internal combustion engine which includes at least one combustion chamber with at least one multi-fuel injector in accordance with one of the exemplary embodiments described earlier. Alternatively or additionally, the internal combustion engine is designed for performing at least one of the operating methods described above. In connection with the internal combustion engine, the advantages already described in connection with the multi-fuel injector and the method are realized.

The internal combustion engine is preferably in the form of a gas engine which is operated with pilot ignition. The internal combustion engine is particularly designed to operate with a gaseous first fuel, in particular natural gas and with a liquid self-igniting fuel, in particular Diesel fuel, as the second fuel. Herewith, in particular the advantages mentioned already earlier are realized.

The internal combustion engine is preferably in the form of a piston engine. In a preferred exemplary embodiment, the internal combustion engine is designed for driving in particular heavy land and water vehicles for example mining vehicles, trains in which the internal combustion engine is installed in a locomotive or in a rail car, or in ships. The use of the internal combustion engine for driving military vehicles for the defense such as tanks is also envisioned. An exemplary embodiment of the internal combustion engine resides also in the stationary use of the internal combustion engine for example for energy supply, as emergency power generator, peak power generator or also general power generator wherein the internal combustion engine is generally connected to, or combined with, an electric generator. Also a stationary use of the internal combustion engine for driving auxiliary aggregates such as fire extinguishing pumps on drilling platforms is possible. Furthermore, an application of the internal combustion engine in the area of the mining fossil raw materials and particularly fuels such as oil and gas is possible. Also a use of the internal combustion engine in the industrial area or in the construction field for example in construction machinery such as a crane or an excavator. If the internal combustion engine is a gas engine, it is suitable particularly for use in a city block heating power plant for the stationary generation of energy.

The description of the multi-fuel injectors and of the internal combustion engine at one hand and the method on the other hand are to be understood to be complementary. Features of the multi-fuel injector and of the internal combustion engine which were explicitly or implicitly mentioned in connection with the method are preferred individually or together combined with features of a preferred exemplary embodiment of the multi-fuel injector or of the internal combustion engine. Method steps which have been described explicitly or implicitly in connection with the multi-fuel injector or the internal combustion engine are individually or together in combination steps of a preferred embodiment of the method. The method includes preferably at least one method step which is based on at least one feature of the multi-fuel injector or the internal combustion engine. The multi-fuel injector and/or the internal combustion engine include preferably at least one feature which is based on at least one step of a preferred embodiment of the method.

Below the invention will be described in greater detail with reference to the accompanying drawing which is a schematic representation of an exemplary embodiment of an internal combustion engine with an exemplary embodiment of a multi-fuel injector.

BRIEF DESCRIPTION OF THE DRAWING

The single FIGURE shows schematically an exemplary embodiment of an internal combustion engine with a multi-fuel injector.

DESCRIPTION OF THE EXEMPLARY EMBODIMENT

The FIGURE shows schematically a part of an internal combustion engine 1 with a multi-fuel injector 3 assigned to a combustion chamber 5 for the injection of fuel into the combustion chamber 5. The internal combustion engine is preferably a reciprocating piston engine, wherein the piston 7 is movably disposed in the combustion chamber 5.

The multi-fuel injector 3 includes a base body 9 in which a nozzle needle 11 is movably arranged. The nozzle needle 11 is shown in the FIGURE in a first functional position in which it is biased under pre-tension onto a needle seat 13. The pretension force is generated among others by a spring element 15 which is supported at one end by the base body 9 and at the other end by a support shoulder 17 of the nozzle needle 11.

The multi-fuel injector 3 further has a first inlet opening 19 for a first fuel, in particular combustible gas, which first inlet opening 19 is in fluid communication with a collection chamber 23 via a first channel 21.

The collection chamber 23 is located—in the flow direction of the first fuel toward the combustion chamber 5—upstream of the needle seat 13 and is in the first functional position of the nozzle needle 11 fluidly separated by the nozzle needle 11 from a fuel injection bore 25. Herein the nozzle needle 11 sealingly blocks a fluid communication path from the collection chamber 23 to the injection bore 25.

Above the nozzle needle 11, there is a control chamber 27 which is in fluid communication with a second inlet opening 29 for a second fuel in particular a liquid self-igniting fuel. There is further a second channel 31 which fluidly interconnects the second inlet opening and the control chamber 27.

In this way, the pressure of the fluid in the control chamber acts directly axially on the surface of the nozzle needle at its end opposite the needle seat 13, that is, specifically on a pressure surface 33 arranged at the end of the nozzle needle 11 opposite the needle seat 13. At the same time, the pressure present in the collection chamber 23 acts on a counter pressure surface 35 of the nozzle needle 11 which is provided on the support shoulder 17. The nozzle needle 11 is biased toward the needle seat 11 by the pressure force in the control chamber 27 acting on the pressure surface 33 and also by the force of the tensioned spring element 15, while at the same time the excess pressure force of the pressure in the collection chamber effective on the counter pressure surface 35 acts in opposite direction, that is, tends to lift the nozzle needle 11 off the nozzle seat 13. (The bottom surface of the shoulder is somewhat larger than the top surface).

The pressure in the control chamber 27 can be released via a control valve 37 which is preferably a magnetically controllable valve. The control valve 37 can be activated so that the pressure in the control chamber drops below the pressure threshold at which the pressure effective on the counter pressure surface exceeds the pressure force effective on the pressure surface 33 and the pretensioning force of the pretensioning element 15, whereby the nozzle needle is moved to a second functional position in which it is spaced from the needle valve seat 13. As a result, the fluid connection between the collection chamber 23 and the at least one injection bore 25 is opened so that fuel present in the collection chamber 23 can be injected via the injection bore 25 into the combustion chamber 5.

Herein the control chamber 27 is in fluid communication with the collection chamber 23 via the control valve 37. There is in particular a third channel 39 which fluidly connects the control chamber 27 to the collection chamber 23 and in which the control valve 37 is arranged and either blocks or opens the third channel 39 depending on the control of the control valve 37. A control leakage from the control chamber 27 occurring when pressurized control fluid is released from the control chamber 27 is therefore directed to the collection chamber 23 via the third channel 39.

The nozzle needle 11 is provided as the only nozzle needle and therefore serves as the only valve element for the first and also for the second fuel. There is consequently only one nozzle needle 11 provided in the multi-fuel injector 3. The collection chamber 23 is a common collection chamber for the first and the second fuel.

It is further noted that the control chamber 27 releases pressurized fluid exclusively into the collection chamber 23. There is no other fluid discharge passage for releasing pressurized fluid from the control chamber 27.

Since the multi-fuel injector 3 includes only a single nozzle needle 11 for both fuels, its design is quite simple and, as a result, it is robust compact and relatively inexpensive. And since the control leakage from the control chamber 27 is released into the collection chamber, any mixing of the fuels upstream of the multi-fuel injector 3 is excluded.

The control valve 37 is preferably a permanently leakage-free valve in particular a permanent leakage-free pilot valve so that it does not provide for pressure relief to a fuel reservoir either. In this way, a mixing of the fuels upstream of the multi-fuel injector 3 is prevented in a particular efficient manner.

In particular, the multi-fuel injector has no pressure release bore from the control chamber 27 to a fuel reservoir for the second fuel.

The multi-fuel injector 3 is operated by conducting, the first fuel into the collection chamber 23 ahead of the needle seat 13. There may be a permanent fluid connection between a reservoir for the first fuel and the collection chamber 23 via the first inlet opening 19. An amount of the second fuel is released from the control chamber 27 via the control valve 37 and the third channel 39 into the collecting chamber 23. This can be done in particular by applying short control signals to the control valve 37 causing in particular a so-called blank-shot-activation or an activation without effects. By multiple repetitions of the application of such short signals, the amount of second fuel released into the collection chamber 23 can be controlled. With the application of such short signals, the nozzle needle 11 is not displaced but remains in its first functional position as shown in the FIGURE.

The preferably liquid second fuel displaces the preferably gaseous first fuel from the area directly around the needle seat so that the second fuel is disposed ahead of the first fuel which serves as pilot fuel.

By applying a control signal to the control valve 37, the first and the second fuel are injected from the collection chamber 23 via the injection bore 25 into the combustion chamber 5 as the nozzle needle 11 is lifted off the needle seat 13 by a depressurization of the control chamber.

It is possible herein that both fuels are injected in a single injection one after the other that is during a single lift-off event of the needle from the needle seat. Alternatively, it is also possible that, first during a short injection event, the second fuel is injected into the combustion chamber 5 as a pilot fuel, whereupon, subsequently, in a second injection event that is during a second nozzle needle lift-off, an amount of the first fuel is injected into the combustion chamber. It is also possible that, before the first injection event, a larger amount of the second fuel is supplied to the collection chamber and, in connection with the second injection event, also—though a small unavoidable control leakage amount of the second fuel is injected into the combustion chamber 5 together with the first fuel. This unavoidable control leakage amount is determined by the flow cross-section of the control valve 37 and the third channel 39 as well as the pressure conditions in the control chamber 27 and in the collection chamber 23.

Preferably, with the control valve 37 closed, the pressure of the first fuel in the collection chamber 23 is lower than a pressure of the second fuel in the control chamber 27. For gaseous first fuels, the pressure is preferably 100 bar to at most 300 bar. For liquid first fuels, the pressure is between 1000 bar and at most 3000 bar. The value of the pressure difference between fuels is selected together with the surface areas generating the hydraulic forces and the pressure losses from the control chamber 27 to the collection chamber 23 preferably in such a way that the desired opening behavior of the nozzle needle 11 as well as the desired flow volume of the second fuel is obtained.

The combustion process in the combustion chamber 5 is preferably so controlled that the first fuel serves as main fuel which generates a major amount of the energy which is provided to the combustion chamber 5 during a working cycle whereas the second fuel serves as pilot fuel which essentially provides for the ignition of the first fuel but which contributes little to the energy supplied to the combustion chamber 5.

Upon injection of the second fuel into the combustion chamber via the injection bore 25, the second fuel is driven by the first fuel and atomized by the first fuel. In this way, a quasi "Air Blast" is obtained wherein, in spite of the comparably small pressure level in the collection chamber 23, an efficient atomization of the liquid second fuel is made possible so that this fuel burns while producing only little soot.

What is claimed is:

1. A multi-fuel injector (3) for an internal combustion engine for injecting at least a first and a second fuel into a combustion chamber of the internal combustion engine, the multi-fuel injector comprising:
    a base body (9) with
    a nozzle needle (11) movably disposed in the base body (9) so as to be movable between a first functional position, in which the nozzle needle (11) is biased toward a nozzle needle seat (13) provided in the base body (9) at one end of the nozzle needle (11) and including at least one injection bore (25) which is blocked by the nozzle needle (11) when the nozzle needle (11) is seated on the nozzle needle seat (13) and a second functional position spaced from the nozzle needle seat (13),
    a fuel collection chamber (23) formed around the nozzle needle seat (13) whereby a fluid connection between the fuel collection chamber (23) and the at least one injection bore (25) is established when the nozzle needle (11) is in the second functional position,
    a first inlet opening (19) In communication with the collection chamber (23) for supplying a first, gaseous fuel to the collection chamber (23),
    a position needle control chamber (27) arranged at an end of the nozzle needle (11) opposite the nozzle needle seat (13) and being in fluid communication with a second inlet (29) for supplying a pressurized second, liquid fuel to the control chamber (27) biasing the nozzle needle (11) into a closed position, and
    a needle position control chamber discharge line (39) provided with a control valve (37) disposed within the injector in communication with the needle position control chamber (27) and extending within the injector to the collection chamber (23) for a controlled release of the pressurized second, liquid fuel from the control chamber (27) to the collection chamber (23) thereby releasing the pressure in the needle position control chamber (27) to lift the nozzle needle (11) from the nozzle needle seat (13).

2. The multi-fuel injector (3) according to claim 1, wherein the control valve (37) is a leakage-free valve.

3. The multi-fuel injector (3) according to claim 1, wherein the control chamber discharge line (9) extends to the fuel collection chamber (23).

4. A method for operating the multi-fuel injector (3) of claim 1, the method comprising the following steps:
    conducting the first fuel to the collection chamber (23) ahead of the nozzle needle seat (13) of the nozzle needle (11),
    releasing the second fuel from the control chamber (27) to the collection chamber (23) via the control valve (37) and the control chamber discharge line (39) and—injecting the first and the second fuel from the collection chamber (23) via the at least one injection bore (25) into a combustion chamber (5) as the nozzle needle (11) is moved off the needle seat (13) by actuation of the control valve (31) for the release therefrom of the pressurized second fuel.

5. The method according to claim 4, wherein a pilot amount of the second fuel is released from the needle position control chamber (27) to the collection chamber (23) by supplying at least one momentary control signal to the control valve (37).

6. The method according to claim 4, wherein the first fuel is gaseous fuel and the second fuel is a self-igniting liquid fuel, in particular Diesel fuel.

7. The method according to claim 4, wherein a pressure of the first, gaseous fuel in the collection chamber (23) is lower than a pressure of the second, liquid fuel in the needle position control chamber (27) when the control valve (37) is closed.

8. The method according to claim 6, wherein the second fuel is disposed in the collection chamber (23) ahead of the first fuel so that, upon opening of the nozzle needle valve the second liquid fuel is first discharged through the injection bore (25) driven by the first gaseous fuel whereby it is atomized in the combustion chamber (5).

9. An internal combustion engine with at least one combustion chamber (5) provided with at least one multi-fuel injector as defined in claim 1.

10. The internal combustion engine according to claim 9, wherein the internal combustion engine is in the form of a combustible gas engine for performing a combustion process with pilot ignition of the combustible gas.

* * * * *